(12) United States Patent
Tiwari et al.

(10) Patent No.: US 12,154,049 B2
(45) Date of Patent: Nov. 26, 2024

(54) COGNITIVE MODEL FOR SOFTWARE DEVELOPMENT

(71) Applicant: INTERNATIONAL BUSINESS MACHINES CORPORATION, Armonk, NY (US)

(72) Inventors: Pranshu Tiwari, Delhi (IN); Saurabh Trehan, Gurgaon (IN); Raghava Venkat, Bangalore (IN); Balakrishnan Sreenivasan, Jayanagar (IN); Renny I John, Bangalore (IN); Harish Bharti, Pune (IN)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 17/511,976

(22) Filed: Oct. 27, 2021

(65) Prior Publication Data

US 2023/0132337 A1    Apr. 27, 2023

(51) Int. Cl.
| | |
|---|---|
| *G06F 8/00* | (2018.01) |
| *G06F 8/34* | (2018.01) |
| *G06F 8/77* | (2018.01) |
| *G06N 5/02* | (2023.01) |
| *G06Q 10/0631* | (2023.01) |

(52) U.S. Cl.
CPC ......... *G06Q 10/06313* (2013.01); *G06F 8/34* (2013.01); *G06F 8/77* (2013.01); *G06N 5/02* (2013.01)

(58) Field of Classification Search
CPC .... G06F 8/77; G06F 8/60; G06F 8/34; G06N 20/00; G06N 3/06; G06N 3/045; G06N 5/02; G06Q 10/06313
See application file for complete search history.

(56) References Cited

U.S. PATENT DOCUMENTS

| | | |
|---|---|---|
| 10,332,073 B2 | 6/2019 | Abebe |
| 10,510,000 B1 * | 12/2019 | Commons .............. G06N 3/045 |
| 10,691,450 B2 | 6/2020 | Jose |
| 2019/0050771 A1 | 2/2019 | Meharwade |
| 2019/0122153 A1 * | 4/2019 | Meharwade ..... G06Q 10/06313 |
| 2019/0129701 A1 * | 5/2019 | Hawrylo ................... G06F 8/60 |
| 2020/0183653 A1 * | 6/2020 | Subbiah ................... G06F 8/77 |
| 2020/0218998 A1 * | 7/2020 | Epperlein .............. G06N 20/00 |
| 2020/0380342 A1 * | 12/2020 | Wortsman ................ G06N 3/06 |
| 2021/0049524 A1 | 2/2021 | Nachum |
| 2022/0012628 A1 * | 1/2022 | Krishnamoorthy .... G06N 20/00 |

(Continued)

OTHER PUBLICATIONS

Wang et al, CN 111311104, (translation) Jun. 19, 2020, 27 pgs <CN_111311104.pdf>.*

(Continued)

*Primary Examiner* — Tuan A Vu
(74) *Attorney, Agent, or Firm* — Schmeiser, Olsen & Watts, LLP; Edward Wixted

(57) ABSTRACT

A method includes using, by one or more processors of a computer system, a cognitive model to estimate software development parameters for a software development project based on one or more similar past projects, and automatically assigning, by the one or more processors of the computer system, story points to sprints of the software development project based on the estimated software development parameters.

20 Claims, 10 Drawing Sheets

| | Business Capability to be Delivered in Sprint (stage1...stage n) | | | | |
|---|---|---|---|---|---|
| | Sprint 1 | Sprint 2 | | | Sprint n |
| | $J_{12}$ | $J_{21}$ | | | $J_{1n}$ |
| | $J_{21}$ | $J_{22}$ | | | $J_{2n}$ |
| | $J_{31}$ | $J_{23}$ | | | $J_{3n}$ |
| | $J_{41}$ | $J_{24}$ | | | $J_{4n}$ |

| Effort Days Left (state) | $x_1 = T - i - 4$ | $x_2 = T - i - 3$ | $x_1 = T - i - 2$ | $x_2 = T - i$ | $f_{BC4}(s)$ |
|---|---|---|---|---|---|
| $t - j$ | $J_{12}$ | $J_{12}$ | $J_{13}$ | $J_{14}$ | $\text{Max}(j_1, \bar{j}_{12}, \bar{j}_{13}, j_{14})$ |
| $t - j - 1$ | $J_{ik}$ | | | $J_{24}$ | |
| $t - j - 3$ | | | | $J_{34}$ | |
| $t - j - 3$ | | | | $J_{44}$ | |

(56) References Cited

U.S. PATENT DOCUMENTS

2022/0261243 A1* 8/2022 Kanamanapalli ......... G06F 8/77
2022/0334837 A1* 10/2022 Sa ............................ G06F 8/34

OTHER PUBLICATIONS

Huberman et al, WO 2016866634, 22-24-2016, 11 pgs <WO_2016186634.pdf>.*
Mell, Peter et al.; "The NIST Definition of Cloud Computing;" National Institute of Standards and Technology; Special Publication 800-145; Sep. 2011; 7 pages.

* cited by examiner

| Business Capability to be Delivered in Sprint (stage1…stage n) | | |
|---|---|---|
| Sprint 1 | Sprint 2 | Sprint n |
| $J_{12}$ | $J_{21}$ | $J_{1n}$ |
| $J_{21}$ | $J_{22}$ | $J_{2n}$ |
| $J_{31}$ | $J_{23}$ | $J_{3n}$ |
| $J_{41}$ | $J_{24}$ | $J_{4n}$ |

FIG. 3

| Effort Days Left (state) | $x^4$ | $f_{BC4}(s)$ |
|---|---|---|
| T-i | $J_{14}$ | $J_{14}$ |
| T-i-1 | $J_{24}$ | $J_{24}$ |
| T-i-2 | $J_{34}$ | $J_{34}$ |
| T-i-3 | $J_{44}$ | $J_{44}$ |

FIG. 4

| Effort Days Left (state) | $x_1 = T-i-4$ | $x_2 = T-i-3$ | $x_1 = T-i-2$ | $x_2 = T-i$ | $f_{BC4}(s)$ |
|---|---|---|---|---|---|
| $t-j$ | $J_{12}$ | $J_{12}$ | $J_{13}$ | $J_{14}$ | Max($j_1, \bar{t}_{12} \bar{j}_{13} \bar{j}_{14}$) |
| $t-j-1$ | $J_{ik}$ | | | $J_{24}$ | |
| $t-j-3$ | | | | $J_{34}$ | |
| $t-j-3$ | | | | $J_{44}$ | |

FIG. 5

COGNITIVE MODEL FOR SOFTWARE DEVELOPMENT

BACKGROUND

The present invention relates to software development using, for example, Agile processes. More specifically, the invention relates to using one or more cognitive models in order to improve, for example, Agile Backlog Planning in a manner that makes it possible to reduce overhead and address potential risks that may arise from lack of a full-time subject matter expert (SME) involvement and to deliver maximum business value given the constraints of Project.

SUMMARY

According to embodiments of the present invention, a method, and associated computer system and computer program product for automatically assigning sprints of a software development project is provided. One or more processors of a computer system use a cognitive model to estimate software development parameters for a software development project based on one or more similar past projects. The one or more processors of the computer system automatically assign story points to sprints of the software development project based on the estimated software development parameters.

BRIEF DESCRIPTION OF THE DRAWINGS

FIG. 3 depicts a first table of business capability to be delivered in sprints for an exemplary software development project using the system for software development of FIGS. 1 and 2, in accordance with embodiments of the present invention.

FIG. 4 depicts a stage transition table for a fourth sprint in an exemplary software development project using the system for software development of FIGS. 1 and 2, in accordance with embodiments of the present invention.

FIG. 5 depicts a stage transition table which moves backwards to sprint 3 for the exemplary software development project using the system for software development of FIGS. 1 and 2, in accordance with embodiments of the present invention.

DETAILED DESCRIPTION

Figure 1:
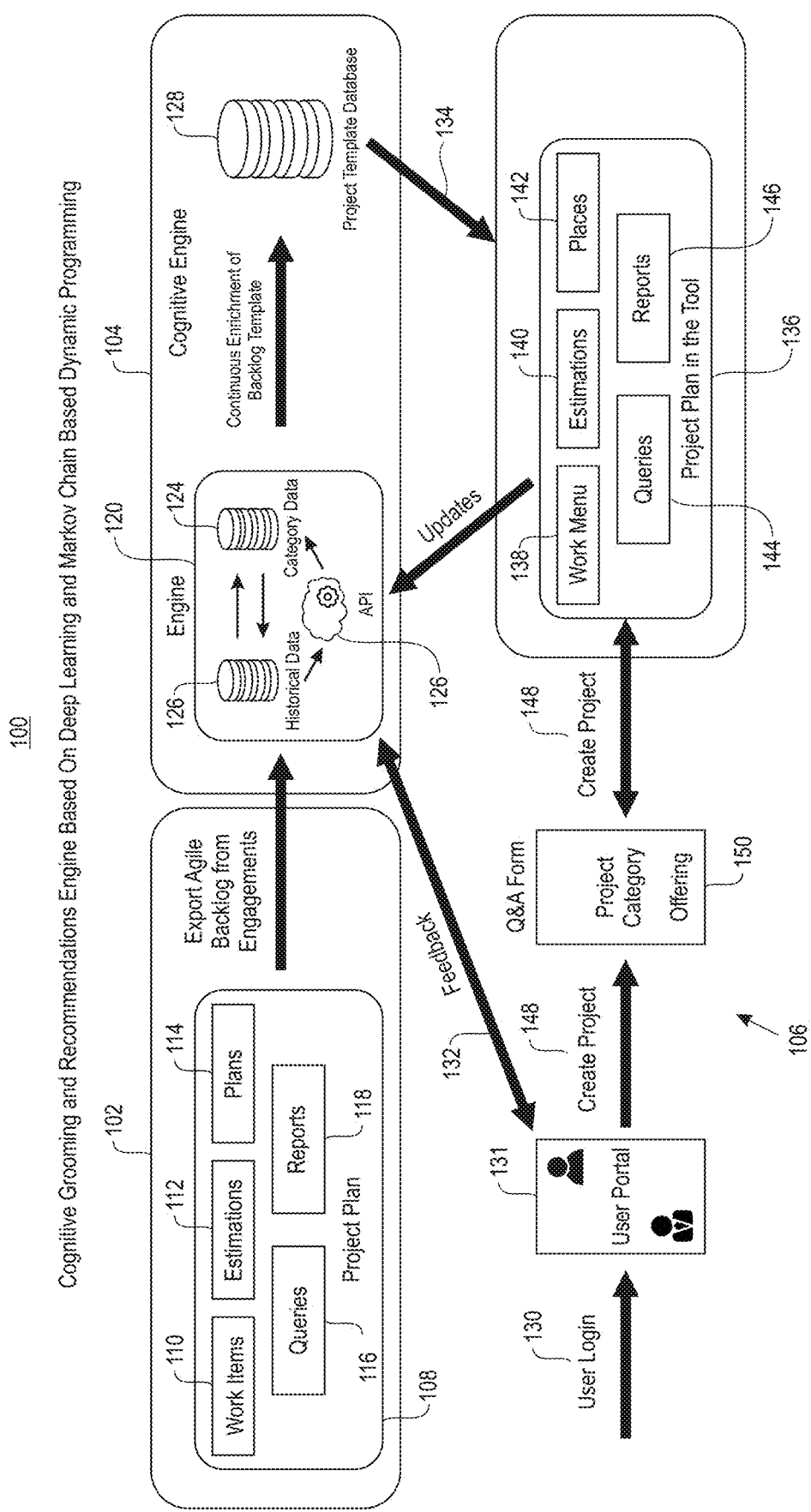
FIG. 1 depicts a system for software development including a process flow, in accordance with embodiments of the present invention.

Software development projects are becoming more and more offering-driven. The present invention realizes that prescriptive approaches to software development may improve efficiencies. Tracking and planning tools can be used to create offering templates, using, for example, Agile software development approaches. Using Agile approaches, a percentage of Product Backlog Items (Epics, Stories, Tasks, Defects, etc.) that belong to a particular offering can often be reusable for future offerings. The present invention utilizes the automatic generation of templates for a new offering, whereby the templates will include most of the reusable items automatically pre-populated. Fields like Story Points, Business Value Points, and Technical Value Points will be used, as contemplated herein. Based on the combination of historical data and current data, the present invention will be able to automatically determine the Sprint Backlog (using the average velocity, Story Points, Business Value Points and Technical Value Points). With the help of data analytics, the system for software development described herein is configured to help teams automatically do all that they would do in a typical planning session—which includes grooming stories into tasks, estimating each of them, and prioritizing.

Collaborative planning sessions are still important. However, the system for software development described herein, when implemented, reduces the overall time spent by automatically prioritizing, estimating, and planning the Sprint Backlog by using the patterns and trends from previous projects that belong to the same Offering.

The present invention allows for predictions for impediments, root cause analysis, and provides the most effective resolutions. Systems and methods described herein are configured to reduce the overall time spent on planning activities and provide more accurate estimations and plans. Systems described herein reduce the dependency on the Product Owner and provide more time available for the team that can be utilized for other productive work like automation. The systems and methods described herein reduce solutioning effort, reduces overall cost of product development, and provide an optimized pathway to maximize Business Value.

As contemplated herein, the system for software development utilizes a cognitive model which is configured to estimate Business Value, Story Points from Similar Projects via deep learning procedures and current story points consumed at a given time. The cognitive model then automatically assigns sprints based on Story Points through a stochastic dynamic programming model where each sprint is a Stage, number of days spent/story points consumed is a State, and number of Story Points to be allocated to a particular sprint is the decision Variable.

The present invention seeks to provide systems and methods capable of performing the several key concepts.

First, systems and methods described herein are configured to perform hyper tuning of parameters to perform feature engineering with an objective to select relevant features for a linear model. Alternatively, in the case that the measurement vectors of a project database is greater than a threshold (e.g. greater than 5), a cross validation process could be used to estimate Shrinkage Parameter to extract relevant Features Additionally, mathematical modeling using Maximum Likelihood Method & Optimizing Loss Function allows for the creation of multiple gradients for linear and/or quadratic prediction models. The present systems and methods described herein can further hyper tune the parameters by getting appropriate loss functions, and identify slope parameter and/or weights for linear as well as non-linear models using stochastic or batch gradient processes or co-ordinate gradient descent process.

Present methods and systems described herein may utilize neural network feed forward propagation, with a number of neurons and a number of hidden layers. Neural network training may be performed using Rectified Linear Unit (RLU) activation. A project management database for systems described herein may include measurement vectors that may be fed as inputs to a neural training database.

Further, selection of best performance models based on a cross validated test data set can be accomplished using Analysis of Variance (ANOVA), Alkaline Information Criterion (AIC) or Test Performance. Alternatively, the present systems and methods may evaluate on AIC and/or Bayesian Information Criterion (BIC) models, if all models are linear models.

As contemplated herein, systems and methods generate the Business Value and Story points for a project template by best model using neural networks, and/or regression, and/or autocorrelation regression. Different permutations may be created by using different models. The systems and methods herein may then use a recursive function to dynamically allocate sprints given the state (Efforts Remaining) and Stage (Sprint). A cognitive engine, using a cognitive model, would optimize the sprints to maximize the Business Value at start and at every stage of the sprint based on a Markov State Stage Conceptual Model. Using the data, the systems and methods herein may automatically prioritize and plan a sprint to maximize the business value. Systems and methods contemplated herein may optimize the entire process to other parameters in addition to business value depending on the needs of client.

As understood the present invention is contemplated for applying to Agile software development planning systems. However, it should be understood that the techniques described herein may be applicable to other types of software development planning systems as well.

The system and method described herein may include the following process during the sprint planning phase of a software development project. First, using the historical average velocity and current project information (sprint length, number of full time equivalents (FTEs), project length, etc.) the system and methods described herein will present a list of items from the prioritized list of User Stories. If all the stakeholders (the team, the project owner, the scrum master, etc.), are all in agreement with this, the team will accept the sprint plan. Once the list of User Stories have been finalized, the systems and methods described herein may then present all the children items (tasks, defects, impediments, etc.) with their estimates and other information based on learnings from previous engagements. If any more changes need to be made, the team will update the tool and the project owner will finally approve the plan. Since the present invention contemplates that the work items will already have acceptance criteria defined, the team will not have to spend more time on sprint planning.

Referring now to FIG. 1, a system for software development 100 including a process flow is depicted, in accordance with embodiments of the present invention. The system for software development 100 includes a software development tracking and planning tool 102, such as an Agile software development tracking and planning tool. The software development tracking and planning tool 102 is operably connected to a cognitive engine 104. The cognitive engine 104 may further interact with a user experience 106, as shown in the process flow below the software development tracking and planning tool 102 and the cognitive engine 104.

The software development tracking and planning tool 102 represents a software development tracking and planning platform or interface, which could be used for Agile planning, or the like. The software development tracking and planning tool 102 may be a web-based tool, a cloud tool, or may be a local software application. The software development tracking and planning tool 102 may include its own processors, storage, databases, and the like, for performing the functionality of issue-tracking, continuous integration and deployment, and general tracking and planning of software development, using for example the Agile planning system.

The software development tracking and planning tool 102 is shown including the capability of storing information related to individual project plans within the tool. The software development tracking and planning tool 102 shows an exemplary project plan 108 in the tool that includes data relating to work items 110, estimations 112, plans 114, queries 116, and reports 118. The software development tracking and planning tool 102 may include the various data 110, 112, 114, 116, 118 stored within one or more databases associated with the software development tracking and planning tool 102. While the exemplary project plan 108 is shown, the software development tracking and planning tool 102 includes data across a range of projects. Pursuant to the process flow herein, the various data 110, 112, 114, 116, 118 stored by the software development tracking and planning tool 102 may be exported to the cognitive engine 104 for processing.

In one embodiment, the software development tracking and planning tool 102 represents a single customer or client, whereby the data exported from the software development tracking and planning tool 102 to the cognitive engine 104 relates to the single customer or client exporting data to the cognitive engine 104. In other embodiments, the cognitive engine 104 may be connected to a plurality of deployments of the software development tracking and planning tool 102 across a plurality of customers or clients. In this case, the cognitive engine 104 may receive and aggregate data across all customers or clients. In still other embodiments, the cognitive engine 104 may be an incorporated feature of the software development tracking and planning tool 102, rather than a third party cloud solution, or may be deployed as a local software solution or add-on to a particular customer using the software development tracking and planning tool 102. Whatever the embodiment, the cognitive engine 104 may be configured to receive exported agile backlog data from previous engagements of projects created within the software development tracking and planning tool 102 by previous customers or clients. In the instance that the cognitive engine 104, it should be understood that the cognitive engine 104 could also be considered the system for software development 100, as described and claimed herein.

The cognitive engine 104 as shown includes an engine 120 that includes a plurality of databases, for example including a historical data database 122 and a category data database 124. The databases 122, 124 are further in operable communication with a rules API 126. In particular, the historical database 122 is contemplated to provide information and data to the rules API 126 which then provides the category data database 124 with categorization information generated by employing the rules API 126 to the historical data 122. The engine 120 may then provide an output to a project template database 128 for storing project templates which are cognitively generated using the historical data provided by the software development tracking and planning tool 102 and processed by the engine 120.

Referring to the portion of the process flow below the software development tracking and planning tool 102 and the cognitive engine 104, several steps are shown, which correspond both to a backend process and user experience (the user interacting with a user interface of the software development tracking and planning tool 102).

At a first step 130 of a user experience, an administrator user, for example, logs in to a user portal 131 to create a new project in an interface of the software development tracking and planning tool 102. At the back end, a project may be created in the software development tracking and planning tool 102, which can be exported as a template and stored in a database within the cognitive engine 104. The user portal 131 may provide a user interface whereby the software platform embodied by the software development tracking and planning tool 102 and the cognitive engine 104 are each interacted with by the user.

At a next step 132, the user may be asked by the cognitive engine 104 to respond to queries, such as by filling out a form containing a plurality of questions. At the back end, data is extracted from the user responses and stored in the historical data database 122, as shown in the feedback process flow. At this step 132, an administrative user can also have a dialogue with the cognitive engine 104 and provide feedback answers to queries and/or have queries answered in the form of feedback by the cognitive engine 104. The data provided by the administrative user may be extracted by the cognitive engine 104 and stored in the category data database 124.

At a next step 134, an applicable template is imported from the project template database 128 of the cognitive engine 104. At the back end, the cognitive engine applies rules from the rules API 126 (i.e. one or more rules tables) to the data received in step 132. The applicable template is imported by the user in the form of an instance of a project plan 136 having its own individualized data associated therewith, including work items 138, estimations 140, plans 142, queries 144 and reports 146. The project plan 136 may be operable in a user instance, or individual project generated by software platform of the software development tracking and planning tool 102.

Finally, at a step 148, a final template is created which will include pre-built work items, estimations, priorities, plans, queries and reports. This final template is created using the data and the rules in the cognitive engine 104. If any updates are made to this template by the user, these updates are exported to the cognitive engine 104 for further processing, in order to allow the template for the category of project to be continually updated as new data is provided by users.

Several prerequisites may exist in allowing the system for software development 100 to perform the functions described herein. In particular, the underlying software development tracking and planning tool 102 may be configured to include fields for both "technical priority" and "business priority." Further, the software development tracking and planning tool 102 and/or the cognitive engine 104 may be configured to include offering templates with pre-defined Epics & User Stories. Every time a new project gets on boarded onto the cognitive engine 104, the project administrator may create a copy of the project from the existing template. The existing template may have all the User Stories that were common across all the previous projects. As described above, the project template database 128 from which the template is drawn gets updated dynamically.

Moreover, each User Story may have various mandatory fields, such as:
Story Points—all the story points from the previous projects related to a particular story may be averaged out to estimate the Story Points for the current project. This may be used as the historical velocity
Business Value Points—all the business value points from the previous projects along with technical value points related to a particular story may be averaged out to prioritize the stories for the current project
Technical Value Points—all the technical value points from the previous projects along with business value points related to a particular story may be averaged out to prioritize the stories for the current project
Acceptance Criteria—the acceptance criteria may be all the acceptance tests that will be run.
Additional fields may include Micro Services and Architecture Pattern, Country of Implementation, and Domain Sector of Implementation Every User Story may also carry over the links, like Tasks—these may be children of the User Stories, which may be worked on to complete a Story. The cognitive engine 104 may capture all the tasks belonging to a particular story along with the estimates (in hours). The average of all the estimates from historical data may be computed by the cognitive engine 104 and used for all the current items.

Based on all the historical data from above, the cognitive engine 104 may be configured to automatically output the following in the form of a template:
All the "Must Have" Product Backlog Items (User Stories)
Story Point Estimations for all the User Stories
Prioritized list of User Stories.
All the tasks linked to the User Stories
Ideal hour estimates of these tasks The data may be analyzed by the cognitive engine 104 and whenever the users and/or team of users is ready for a Sprint and/or Release Planning, a list of Product Backlog items that are of high priority may be presented to the team of users by the cognitive engine 104. This list may include just enough items based on the average historical data, and may also include the breakdown of all the stories, with their average estimates over time, the acceptance criteria, common impediments/defects, etc. This historical data may also be used during Solutioning, Estimation & Planning phases of a software development project. Test data may be captured and reused as applicable By way of example, a project may fall under the category of an "Offering", for example, an Offering A. The cognitive engine 104 and/or the system for software development 100 may first have a pre-built template with all the common Stories, Tasks, Defects, etc based on historical past projects and the data collected therefrom. This template may also include estimates and priorities for each item. When a Project (e.g. "Project A") belonging to the Offering A gets on-boarded into the cognitive engine 104 and/or the system for software development 100, it may then be copied from the template project stored within the project template database 128. The Project A will then be provided all the planned items in template form which can now customize by the user team to the specific project.

In this manner, Historical Data such as Story Points, Business Value Points, Technical Value Points, Velocity, Defects, etc., from all previous projects may be collected and analyzed by the cognitive engine 104 and/or the system for software development 100. Based on this historical data and the current data, the cognitive engine 104 and/or the system for software development 100 may be configured to automatically suggest all those Stories that the user team should work on in the next Sprint. Once the Stories are picked, all the tasks, impediments, and/or defects related to these Stories based on the historical/current data may also be presented to the user team by the cognitive engine 104 and/or the system for software development 100. Thus, the user team may use this data and update the project template (if required) for the Project A. The user team may thus be able to reuse most of the existing data, and also accurately estimate their work. Using the above approach, this may reduce the overall planning effort by a substantial margin. The data provided to the cognitive engine 104 and/or the system for software development 100 may also help reduce the effort during grooming sessions that are conducted over the course of the project. The data may also help during Solutioning to come up with accurate estimates and timelines.

Figure 2:
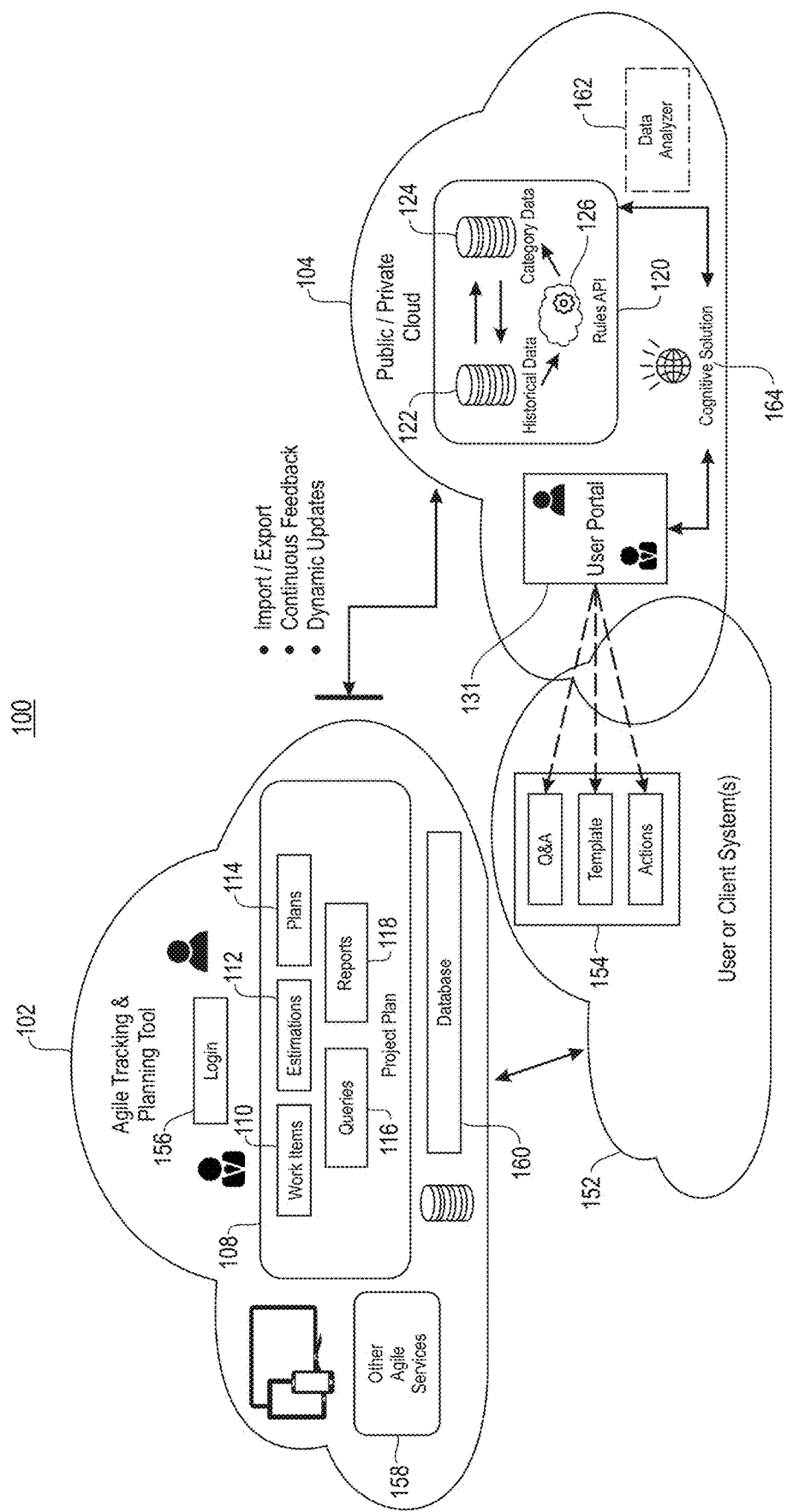
FIG. 2 depicts an architectural view of the system for software development of FIG. 1, in accordance with embodiments of the present invention.

FIG. 2 depicts an architectural view of the system for software development 100 of FIG. 1, in accordance with embodiments of the present invention. The architectural view shows an embodiment of the system for software development 100 whereby the cognitive engine 104 is a separate cloud based system from the software development tracking and planning tool 102. As shown, each of the software development tracking and planning tool 102 and the cognitive engine 104 may be cloud based systems which each are operably connected the same user or client system 152. The user or client system 152 may comprise at least one user device 154 from which the software development tracking and planning tool 102 and the cognitive engine 104 communicate. In contemplated embodiments, the user or client system 152 may include many user devices, profiles or accounts, each integrating with the cloud based tools comprising the software development tracking and planning tool 102 and the cognitive engine 104.

As shown in FIG. 2, the software development tracking and planning tool 102 may includes its own user login 156 separate from the user portal 131 of the cognitive engine 104. However, in some embodiments, the user portal and login may be shared across systems. The software development tracking and planning tool 102 may be capable of performing various agile related services via Agile service modules 158. Likewise, the software development tracking and planning tool 102 may include its own database 160 for storing information related to the user or client's experience using the software development tracking and planning tool 102.

The cognitive engine 104 may be in constant communication with the software development tracking and planning tool 102 in order to both import and export data, provide continuous feedback and provide dynamic updates to the user or client systems 152 either directly or through the software development tracking and planning tool 102. The cognitive engine may further include its own data analytics module 162 in the form of one or more processors configured to perform the functionality described herein. Thus, the cognitive engine 104 may be configured for providing cognitive solutions 164 back to the user or client system(s) 152, for example, via the user portal 131. As shown, the user portal 131 is configured to provide an interface for the user device 154 from which to receive query input related to questions asked by the cognitive engine 104, provide templates or other actions to the user device 154.

The machine learning aspect of the cognitive engine 104 may use data set variables associated with software development processes, such as Agile software development. For example, work item data may include data related to Epics, Stories, Defects, Tasks, or Impediments. Epic data may include Children data related to Children Stories and Impediments. Stories data may include Business Value Points, Technical Value Points, Story Points, Acceptance Criteria, and Children data for a Story including Children related Tasks, Defects and Impediments. Defect and Task data may include both estimates and actual data. Impediment data may relate to the impact of impediments. Further, data may relate to Plan data including standard sprint plans. Data may relate to Query data and Report data including standard queries and reports, as well as Work Item data related to Business Capability.

Moreover, the cognitive engine 104 may collect Category-related data including Offering data related to the type of offering a project belongs to, Customization category data, custom field data, custom attributes data, and Offering taxonomy data including Offering feature sets, backlog templates, and the like.

The cognitive engine 104 may further comprise rules data including prioritization rule data. For example, the cognitive engine 104 may store prioritization rules related to the average Business Value Points (BVP) of a project. Prioritization rules may be configured to sort this data from high to low. Prioritization rules may provide that the higher the BVP of a Story, the higher the cognitive engine 104 and the rules thereof may consider its priority. In another example, the cognitive engine 104 may provide prioritization rules related to whether Technical Value Points (TVP) are greater than BVP. In such an example, a prioritization rule may state that the TVP are considered the priority. Prioritization rules may further state that in the case of conflicts with the TVP and BVP, the current priority of high, medium or low is applied in conjunction with the rules related to BVP and TVP.

The cognitive engine 104 may further comprise rules data including estimation rule data. Estimation rules may include averaging story points from all previous project's data that belonged to a specific offering (project) within a certain category type of project. Moreover, estimation rules may average the hours from all previous project's data that belonged to a specific offering (project) and category type of project.

Still further, the cognitive engine 104 may include rules data including impact rules data. Here, the cognitive engine 104 may include one or more rules sets for considering both Impediment type and Impact severity of the Impediment.

The above-described cognitive engine 104 and/or the system for software development 100 may be configured to conduct Product Backlog Grooming whereby Product Backlog Items (PBIs) are provided by the cognitive engine 104 and can be reviewed by the user team. Similarly, BVP may be automatically and cognitively generated by the cognitive engine 104 and reviewed by the user team if required. Thus, the cognitive engine 104 and/or the system for software development 100 may be provide Product Backlog Grooming estimates which will only have to be reviewed and updated by a user team, if necessary. The usual prior art steps of defining Epics and User Stories (PBIs), manual prioritization using BVP and manual estimation using Story Points is cognitively and automatically performed by the cognitive engine 104 and/or the system for software development 100, in accordance with embodiments of the present invention described herein.

Similarly, the above-described cognitive engine 104 and/or the system for software development 100 may be configured to conduct sprint planning by updating and re-prioritizing PBIs if required, reviewing the suggested tasks and impediments and updating a software development plan if required, and reviewing the task estimates and updating a software development plan if necessary. The usual prior art steps of performing these steps manually are now performed automatically by the cognitive engine 104 and/or the system for software development 100, in accordance with embodiments of the present invention described herein.

A model construct for the above described cognitive engine 104 and/or the system for software development 100 will hereafter be described by way of an exemplary embodiment. The following are the independent variables or measurement vectors $\vec{x}$ used in the dimensional space D, where $\{X1, X2, X3\} \in R^D$. The independent variables or measurement vectors may include:

Story
Capability Area [SSO, Payments, Outage, Request for Quotation, Outage Maps, List of All Plans]
Type-Standard Min, Standard Medium, Standard High
Sector-Insurance, Banking, Utility, Telecommunications
Country
Number of Micro Services
Architecture Pattern
  It is possible to end up creating a matrix X= $[\vec{x_1}\ \vec{x_2}\vec{x_3}\ \ldots\ \vec{x}]$ where each i represets charectersitics of prooject
The Potential Response Variables R may include:
Story Points (Based on Technical Value)
Business Value point of the disclosure
Velocity
Defects A matrix X with m observations and n variables for Story Point Estimation in accordance with the above methodology may thereby comprise:

$$(X) = \begin{bmatrix} x_{11}\ x_{12}\ x_{13}\ ..\ x_{1n} \\ x_{21}\ x_{22}\ x_{23}\ ..\ x_{2n} \\ .. \\ .. \\ x_{m1}\ x_{m2}\ x_{m3}\ ..\ x_{mn} \end{bmatrix}$$

In a first step, hyper tuning of parameters to perform feature engineering is conducted, if necessary. The objective of this step is to select relevant features for a linear model. This step may be governed by the equation:

$$\text{Minimized Error} = \left(\sum_1^n y - \beta_0 - \sum_1^p \beta_i * x_{ij}\right)^2 + \lambda \sum_i^p \beta_p^2$$

By Varying $\lambda$ it is possible to minimize the error, and at a selected $\lambda$ with lowest error it is possible to select the appropriate features needed for a Regression and/or Machine Learning Process. It is contemplated to use an L1 loss function or an L2 loss function method to select the appropriate predictors. This may be applicable if there are many features, for example.

In the case of measurement vectors in a project database being more than a threshold number (e.g. 5), a cross validation process may be used to estimate a shrinkage parameter to extract relevant features.

During a modeling part of the model construct Residual or errors of the linear model may be checked and a correlation to select a linear regression may be conducted. Alternatively or in addition to the linear regression, auto regression and/or neural networks may be utilized.

Since residual ($\dot{\iota}$) is equal to error, the cognitive engine 104 and/or the system for software development 100 may be configured to check if:
Errors have normal distribution
Errors should have mean=zero
Errors should be independent—In case correlation is found, it is possible to use Auto Correlation Regression to Estimate Slopes
Errors should have same variance In case any of these conditions are not met, the cognitive engine 104 and/or the system for software development 100 may be configured to create polynomial function for $x_1$, $x_3$, $x_4$, $x_5$, $x_6$, $x_7$, ... $x_{12}$, ... parameters and identify the model, or create a product of variables $x_1 x_2 + x_2 x_3$ as variables.

Using Shapiro Testing to check Normality of Residuals:

$$W = \left(\sum_1^n a_i x_i\right)^2 / \sum_1^n (x_i - x_{av})^2$$

Where W is a test statistic, xi represents the ith order statistic, and a is a constant which is a function of covariance.

A mathematical model using a maximum likelihood method and optimizing loss function is further contemplated. Here, the cognitive engine 104 and/or the system for software development 100 may create multiple Gradients for linear, Quadratic Prediction models. The Gradient may be the function $f(x)$ with respect to Slope Parameters. The cognitive engine 104 and/or the system for software development 100 may further hyper tune the parameters by getting appropriate Loss functions:

$$p(y|\vec{X_i}, \theta) = N(y|f(\vec{X_i}), \sigma^2)$$

(by assuming it is multivariate distribution)

$$\Rightarrow X \in R^d, y \in R \text{ and } y = f(x) + \varepsilon \text{ where } \varepsilon = N(0, \sigma^2) p(y|X, \theta) = N(y|X, \theta, \sigma^2)$$

where $\vec{x_i}$ is a vector of random variables for i th sample, $p(y|\vec{x_i})$ is the likelihood of a probability density function of y at $x^T$, and hence $y = x^T \theta + \varepsilon$, or it is possible to say that $y_i = \theta_0 + \theta_1 x_1 + \theta_2 x_2 + \theta_3 x_3 + \ldots e_i$ and thus $p(y|x, \theta) = N(y|x, \theta, \sigma^2)$.

However, there may be odd case that some software projects may be correlated. In case the software projects are related the observations may not be independent. In such case, the cognitive engine 104 and/or the system for software development 100 may alter the above model. For example, in the case there are two groups and/or two companies and/or data from two states or two countries, the data may be correlated and the cognitive engine 104 and/or the system for software development 100 may create a new Covariance Matrix:

$$\text{Covariance} \sum = \Omega = \begin{bmatrix} 1 & \varphi & 0 & 0 \\ 0 & 1 & 0 & 0 \\ 0 & .0 & 1 & \rho \\ 0 & 0 & \rho & 1 \end{bmatrix}$$

Hence, the cognitive engine 104 and/or the system for software development 100 may compute $\beta=(X^T\Omega^{-1}X)^{-1}X^T\Omega^{-1}A$ $p(y|X, \beta)=N(y|f(x), \sigma^2) \Rightarrow X \in R^d$, $y \in R$ and $y=f(x)+\varepsilon$ where $\varepsilon=N(0,\sigma^2)$ and hence $p(y|X, \beta)=N(y|X, \beta, \psi\sigma^2)$ where X is a vector of measurements. Taking log of both sides, it is possible to minimize with respect to $\beta$, $\sigma$, $\rho$:

$$L(\beta, \sigma_1^2 \rho) = -\frac{1}{2\sigma^2}(y - xp)^T \cdot \psi^{-1}(y - x\beta) + \text{Cons}$$

Taking Log both sides $$-\log P(y|_1 X, \theta) \ldots = -\log \prod_{n=1}^{N} P(y_n|x_n \theta) \ldots \text{taking log both sides} \quad \text{(Eq. 1)}$$

$$= > -\log P(y|X, \theta) = -\sum_{n}^{N} \log P(y_n|x_n, \theta)$$

$$= > L(\theta) = -\log P(y|X, \theta, \Psi, \Sigma) = \log\left(\frac{1}{\sqrt{2\pi\sigma^2}} * e^{\left(\frac{(y-x^T\theta)^2}{2*\sigma^2}\right)}\right)$$

$$= > L(\theta) = -\frac{1}{2\sigma^2}(y_n - x_n^T \theta)^2 \Psi^{-1} + \sum_{n=1}^{N} \log\left(1/\sqrt{2*\pi\sigma^2}\right)$$

It is now possible to minimize $L(\theta)$ using Gradient Descent Algorithm, using the following steps:
1.

$$\text{vector } \vec{\theta} = \begin{bmatrix} \theta_1 \\ \theta_2 \end{bmatrix}$$

represents parametric vector
2. Set Iteration=0 and put initial parameters for learning rate ($\eta$) and Epsilon
3. Calculate $\nabla L(\vec{\theta})$ ... which is gradient Vector
4. While $\nabla L(\vec{\theta}) > $ Epsilon:
   a.

$$\vec{\theta}_{N+1} = \vec{\theta}_N - \eta \sum_{i-1}^{N} \left\{\nabla L(\vec{\theta})^T\right\}$$

where N refers to training measurements over X, Y
   b. N=N+1
5. end While
6. Return $\vec{\theta}$ {Optimized value}

It is thus possible to create Multiple loss functions and multiple gradients (based on linear and Non Linear Models) to arrive at optimized $\vec{\theta}$ To minimize to loss function in Eq. 1, above.

It is further possible to identify slope parameters for linear as well as non-linear models using a stochastic or batch gradient process. For example, a neural network feed forward propagation with a number of neurons and a number of hidden layers is contemplated. Neural network training may use RLU activation. The project management database of the cognitive engine 104 may include measurement vectors that may be fed as inputs into a neural training database using the following equation:

$$w_0+w_1x_1+w_2x+w_n x_n=w^T x \quad \text{eq (3)}$$

It is then possible the vary the weights through the following vector transformation:

$$w_{J+1}=w_J+(y-y_J)x_i$$

$$l(w)=-\Sigma(y_i-y)x_1^T w$$

The cognitive engine 104 and/or the system for software development 100 may then continue to change the weights until $$\frac{\partial}{\partial w} l(w)' = 0.$$

Thus:

$$w = w + \eta + \sum_{1}^{n}(y_i - y)x$$

In a next step, selection of best performance models based on a cross validated test data set can be accomplished using Analysis of Variance (ANOVA), Alkaline Information Criterion (AIC) or Test Performance. Here, for each $f_1 \ldots f_n \ldots$ the cognitive engine 104 and/or the system for software development 100 may calculate a Sum of Square Error for Y, a Sum of Square for x and a Product of Sum of Square Error of x,y.

A first option uses ANOVA model selection, using the following equations:

$$SSE = \sum_{i=1}^{n}(Y_i - \hat{Y}_i) \quad df_E = n - 2$$

$$\beta_1' = Sxy/Sxx \text{ and } \beta_0^1 = y - \beta_i \bar{x}$$

$$Sxy = \sum(xi - \bar{x})(yi - \bar{y}) \text{ and } Sxx = \sum(xi - \bar{x})^2$$

Where a creation of a diagnostic plot can be calculated as $\Omega_\beta = \Omega_e/\text{sqrt}(Sxx)$ where $\Omega_e$ is the error variance, and a mean square of error=SS(Residual)/n−2. A comparison of models may be done, where the ANOVA t-test is provided by the following equation:

$$t \text{ test} = \frac{\beta_1' - \beta_0}{\text{Estimated Standard Error } \beta}$$

Using ANOVA testing, the cognitive engine 104 and/or the system for software development 100 may be configured to compare the F-value and the P-value of different models (e.g. linear, quadratic, etc.). The null hypothesis may be that model 1/linear regression mode is sufficient to explain the variation in dependent variables and no model is required.

However, it the case that the p value is less, the null hypothesis may be rejected. This test may be continued to be performed until the null hypothesis cannot be rejected:

F=Variability between Group/Variance within group $$\text{Variability between group} = \sum_{1}^{n} \frac{(e_{iav} - E_{IAV})^2}{K-1}$$

$e_{iav}$=Denotes Mean for the data in the group
$E_{IAV}$—Denotes Mean of all the data
$(e_{ij})$=Value of i th observation jth group
Where K Denotes the number of Groups, and the variability within the group is equal to:

$$\sum_{i=1}^{k}\sum_{1}^{n}(e_{ij} - e_{av})^2 / (N-K)$$

Another option uses AIC or Alkaline Information Criteria for Model selection for continuous variables. Here:

$$AIC = n\log\partial^2 + 2k$$

$$\partial^2 = \text{Residual Sum of} \frac{\text{Square}}{n}$$

where n=the sample size or number of agile machine learning cases, and k=the number of model parameters. Here, the model examines AIC and identifies the minimum AIC among them. The one with the lowest AIC will be the preferred model. Additionally, the cognitive engine 104 and/or the system for software development 100 can use R2 to check the specificity of the model to determine the best model for Agile Story point creation in case there is no polynomial function, where:

$$r^2 = \frac{(yi - \bar{y})^2}{(yi - ym)^2}$$

and the model is found with Max $(\gamma^2)$.

In still another option, test error can be used on a performance data set. The steps of this process may be repeated for other dependent variables, such as Issues or Defects.

The cognitive engine 104 and/or the system for software development 100 may be configured to select the best performance model based on a cross validated data set. Alternatively, it is possible that the cognitive engine 104 and/or the system for software development 100 may also evaluate based on AIC and/or BIC models if all models are linear models.

With the above-described model construct it is possible for the cognitive engine 104 and/or the system for software development 100 to predict various parameters such as Business Value Points, Story Points, Technical Value Points, etc.) using machine learning, it is possible to extend this to neural networks and/or cognitive modeling where slope parameters become weights for a deep Neural network. In such a deep neural network, the predictor variable becomes function as per below y=$f_1 f_2 f_3(\vec{x}_i)$. Once this occurs, the cognitive engine 104 and/or the system for software development 100 may also be configured to calculate maximum business value from the total planned sprints given the constraints of Budget and Effort. This may be achieved by using a recursive function which helps optimize the shortest path using dynamic programming based on Markov State Stage concepts.

For example, in the instance that a software development project includes n sprints to be delivered in a time period t=$i_1$, for (Business Capability 1, Business Capability 2 . . . Business Capability n), the number of sprints planned or forecasted may be known as variable J. Using dynamic programming, the cognitive engine 104 and/or the system for software development 100 may be configured to define the following three parameters:

Stage—the cognitive engine 104 and/or the system for software development 100 will show a number of business capabilities to be delivered in Sprint (Stage 1 . . . . Stage n). Here in this example, it will be from Sprint 1, Sprint 2 . . . Sprint j)

State—the cognitive engine 104 and/or the system for software development 100 will show a number of effort days left in completion of sprint and the total number of story points left.

Decision—the cognitive engine 104 and/or the system for software development 100 will calculate a number of days and/or story points to be spent for any next sprint.

FIG. 3 depicts a first table of business capability to be delivered in sprints for an exemplary software development project using the system for software development 100 of FIGS. 1 and 2, in accordance with embodiments of the present invention. Using the dynamic programming using the above described parameters (Stage, State and Decision), for each stage, the formula may be: stage n[business capability (BCn)/Sprint], where J defines Business value of each business capability; and i defines the state which shows no of effort days left. As shown in FIG. 3, a first column includes the business values for Sprint 1, a second column includes the business values for Sprint 2. Additional columns may represent the business values for the various stages, through Sprint n.

With the above data, the following equation may be used to maximize business value:

$$f*_n(s) = \max_{x_n} f_n(S_n x_n)$$

$f_n(s)$=max $[c_{5x_n} + f_{n+1}(x_n)]$=business value delivered given the cognitive engine 104 and/or the system for software development 100 is calculating business value for sprint n while the software development project is in state s.

For example, if Sprint 4 needs to be delivered given that Sprints 1-3 have been delivered, and the software project is at the beginning of Sprint 4: T=Total Duration of Project, where t–i or t–i–1 or t–i–2 or t–i–3 days are left.

Given the three states, the cognitive engine 104 and/or the system for software development 100 may be configured to choose the business value (which can be further configured to cost savings, business impact, etc.) that can be delivered from the table of FIG. 3. FIG. 4 depicts a stage transition table for a fourth sprint in an exemplary software development project using the system for software development 100 for software development of FIGS. 1 and 2, in accordance with embodiments of the present invention. The left most column has different rows which show the state in which sprint 4 is completed. The sprint can complete in T–N where T is the total effort of entire project and N is the story points consumed till sprint 4 (As per the original plan). However, the actual state could vary from T−N−j, T−N−j, where j can be arbitrary number. This is because there may be some technical debt left at the end of the sprint. The different columns indicate decision variables which denotes the potential options for capacity of future Sprint (in this particular case Sprint 5). In this particular case, Sprint 5 may be considered to contain T−I . . . . T−I+1 which denotes the capacity of upcoming sprint (which can take any value from T−I to t−I+p), where I and p are arbitrary numbers to denote the decision to estimate the capacity of next sprint. The central values in the matrix correspond to business value that can be delivered in Sprint 5 given the state of Project in the given state and capacity selected for sprint 5. The rows corresponding to right most column indicates the maximum business value obtained among different decision variables, given the current state of Project.

FIG. 5 depicts a stage transition table which moves backwards to sprint 3 for the exemplary software development project using the system for software development 100 of FIGS. 1 and 2, in accordance with embodiments of the present invention. Here, the rows in the left most column indicate the state in which Project is in at the end of Sprint 3. The different columns indicate decision variables which denotes the potential options for capacity of the next Sprint (in this case Sprint 4). In this particular case, Sprint 4 may be considered to contain T−I . . . T−I+1, which denotes the capacity of Future Sprint (4 in this case), which can take any value from T−I to t−I+p, where I and p are arbitrary numbers to denote the decision to estimate the capacity of the upcoming sprint. The central values in the matrix correspond to business value that can be delivered in Sprint 4 given that the project is in the given state at the end of Sprint 3 and it is possible to choose the next sprint to have a capacity of T−I points. The rows corresponding to right most column indicates the maximum value of business value given the current state of Project across all decision variables selected.

Figure 6:
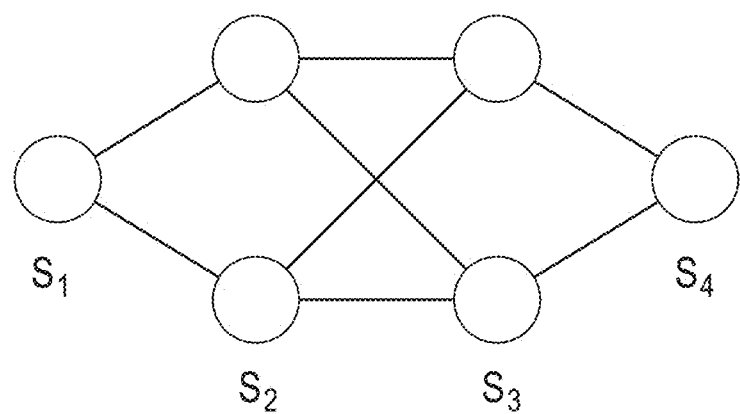
FIG. 6 depicts a four stage, two state based dynamic model for the system for software development of FIGS. 1 and 2, in accordance with embodiments of the present invention.

The above results may be configured to optimize and calculate maximum business value from the number of planned sprints. This may help in sprint planning and realizing business value. FIG. 6 depicts a four stage, two state based dynamic model for the system for software development of FIGS. 1 and 2, in accordance with embodiments of the present invention. The model shown includes four stages, and includes two states. However, other dynamic models may be deployed having more or less stages, and more or less states.

Figure 7:
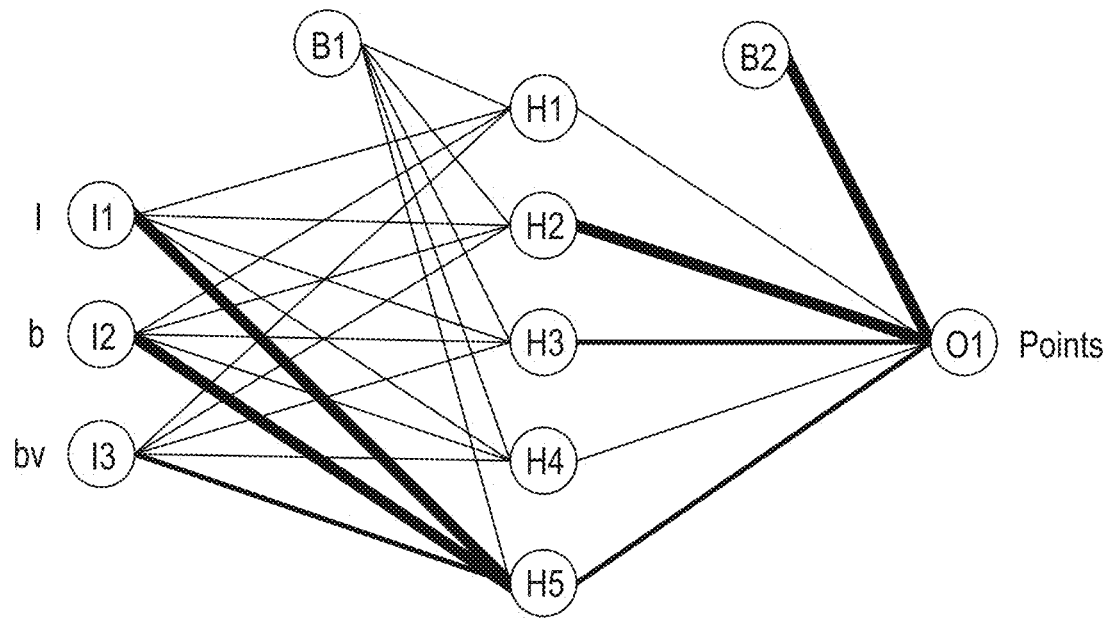
FIG. 7 depicts a neural network-based model for the system for software development of FIGS. 1 and 2, in accordance with embodiments of the present invention.

FIG. 7 depicts a neural network-based model for the system for software development 100 of FIGS. 1 and 2, in accordance with embodiments of the present invention. The shown neural network-based model may use maximum likelihood estimation for a linear function. Since linear functions have the same parameters obtained by linear regression, it is possible to use a closed form linear regression method instead. A neural network-based model such as the model shown schematically in FIG. 7 may simulate stories against different capability areas within different categories, lengths of user stories, and the like. Residuals vs predicted values, standard deviation of residuals vs theoretical quantiles, the square root of standard deviance of residuals vs predicted values, and standard Pearson residuals vs leverage may be plotted. Histograms may further be output including the frequency of residuals. Through neural network-based modeling it is possible to know the Story points to assign a user story having a known length of a story, known category, and known business value, for example.

Figure 8:
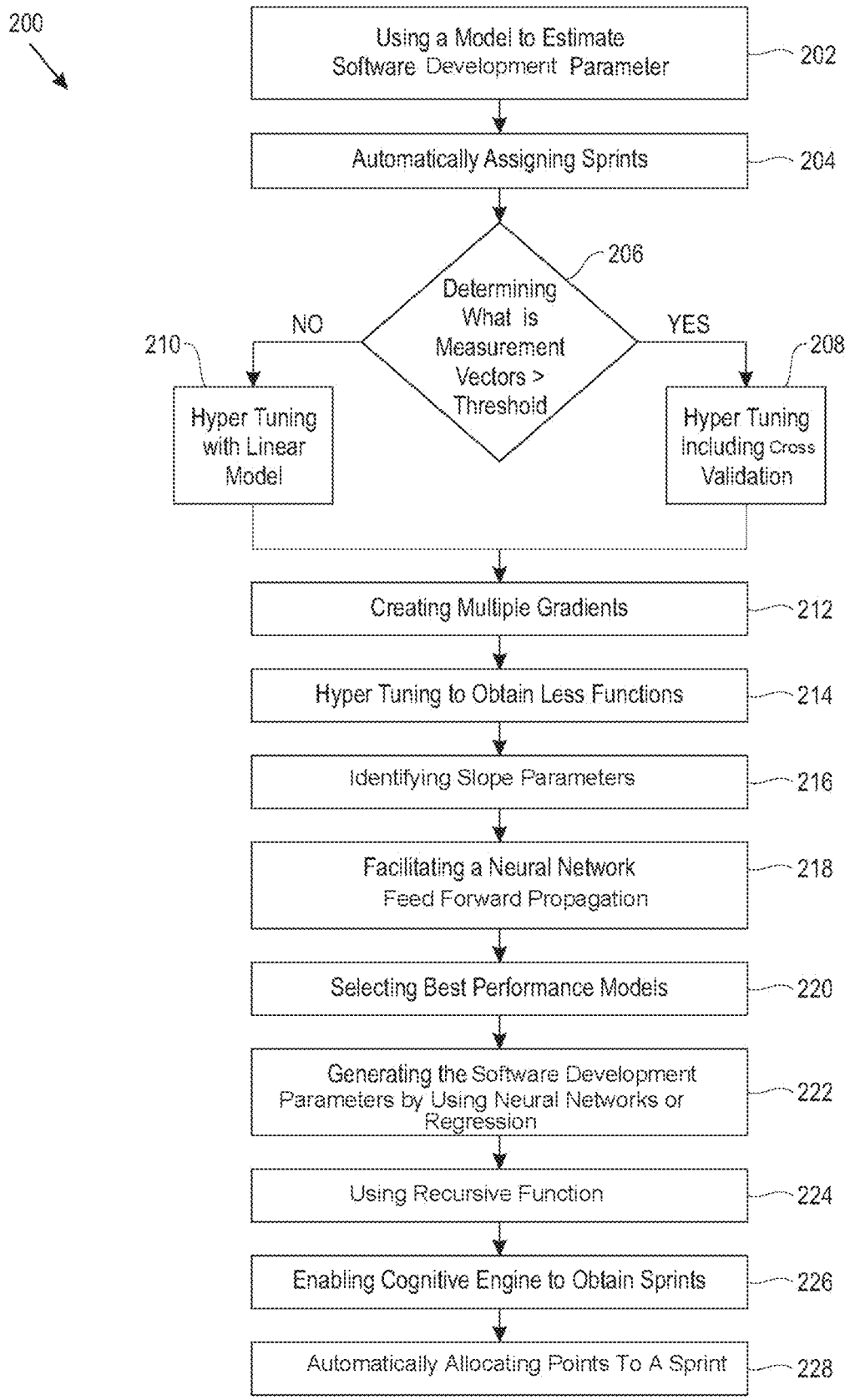
FIG. 8 depicts a method for software development using the system for software development of FIGS. 1 and 2, in accordance with embodiments of the present invention.

FIG. 8 depicts a method 200 for software development using the system for software development 100 of FIGS. 1 and 2, in accordance with embodiments of the present invention. It should be understood that the method 200 is shown as a process flow including a number of steps. However, the steps shown of the method 200 may be performed in any order, and the order of the method shown is meant to be exemplary.

In a first step 202, the method includes using, by one or more processors of a computer system such as the cognitive engine 104 and/or the system for software development 100, a cognitive model to estimate software development parameters for a software development project based on one or more similar past projects. The method 200 includes a step 204 of automatically assigning, by the one or more processors of the computer system, sprints of the software development project based on the estimated software development parameters.

The method 200 still further includes a step 206 of determining, by the one or more processors of the computer system, that measurement vectors in a project management database for the software development project are greater than a threshold. If yes, the method 200 includes a step 208 of hyper tuning, by the one or more processors of the computer system, the software development parameters to achieve feature engineering with an objective, the hyper tuning including a cross validation process for estimating a shrinkage parameter to extract relevant features. If no, the method 200 includes a step 210 of hyper tuning, by the one or more processors of the computer system, the software development parameters to achieve feature engineering with an objective, the performing including selecting relevant features for a linear model and running the linear model.

The method 200 further includes a step 212 of using, by the one or more processors of the computer system, a mathematical model to create multiple gradients for one or more prediction models, a step 214 of hyper tuning, by the one or more processors of the computer system, the software development parameters to obtain one or more appropriate loss functions, and a step 216 of identifying, by the one or more processors of the computer system, slope parameters for the one or more prediction models using at least one of a stochastic and batch gradient process.

The method 200 includes a further step 218 of facilitating, by the one or more processors of the computer system, a neural network feed-forward propagation having a number of neurons and a number of hidden layers, wherein training the neural network is performed using a rectified linear unit (RLU) activation, and wherein a project management database for the software development project includes measurement vectors that are fed as inputs into the neural network feed-forward propagation.

The method 200 includes a further step 220 of selecting, by the one or more processors of the computer system, best performance models based on cross-validated test data set to evaluate whether all models are linear models and a step 222 of generating, by the one or more processors of the computer system, the software development parameters by using neural networks or regression.

The method 200 includes a further step 224 of using, by the one or more processors of the computer system, a recursive function to dynamically allocate the sprints given the effort remaining and stage of the sprint; a step 226 of enabling, by the one or more processors of the computer system, a cognitive engine of the cognitive model to optimize the sprints and maximize a business value parameter of the software development parameters at the start of the sprint and at every stage of the sprint based on a Markov state stage conceptual model, and a step 228 of automatically, by the one or more processors of the computer system, allocating points to a next sprint based on current state.

Figure 9:
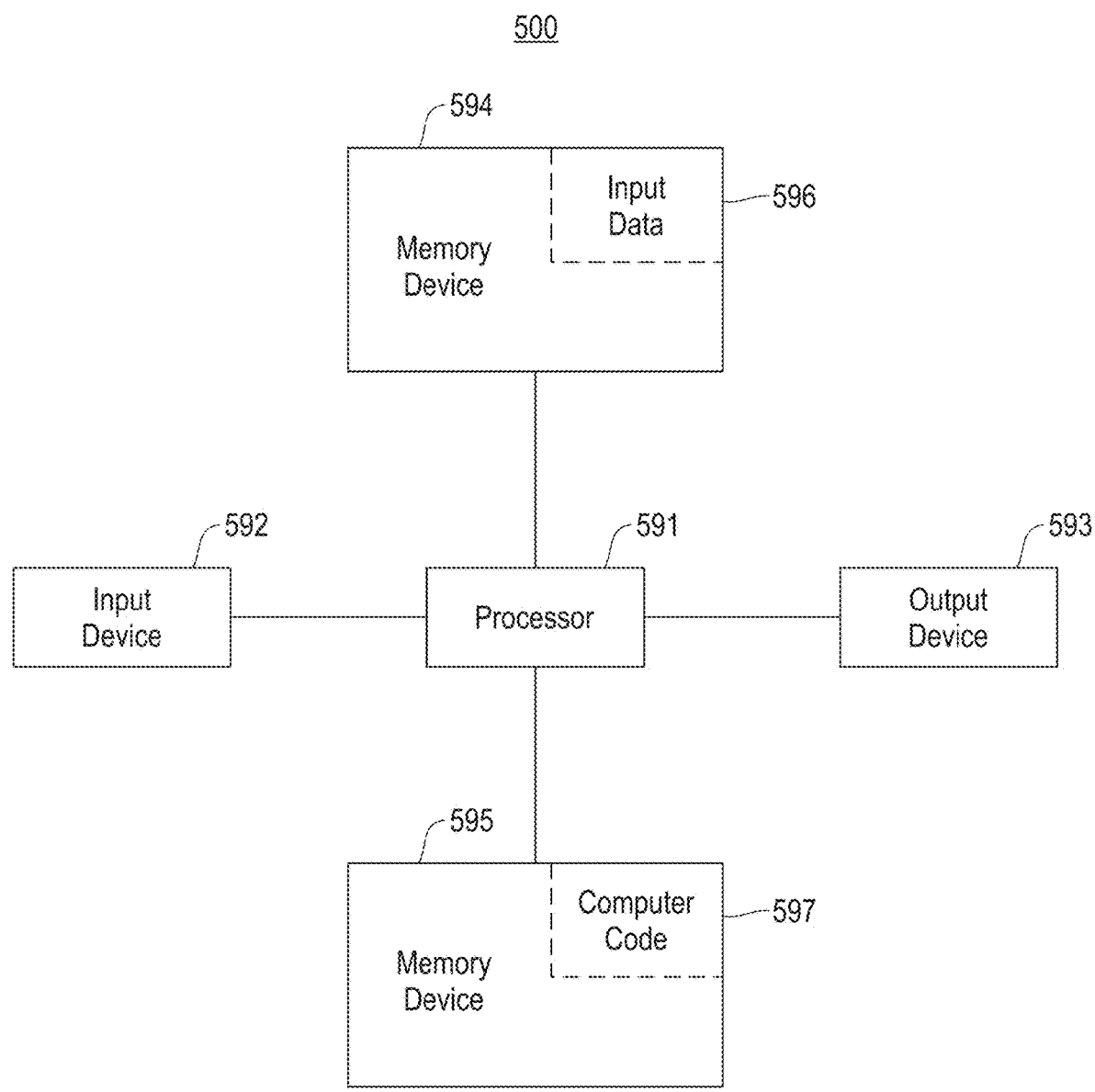
FIG. 9 depicts a block diagram of an exemplary computer system that may be included in the system for software development of FIGS. 1 and 2, capable of implementing process flows and methods for software development of FIGS. 1-8, in accordance with embodiments of the present invention.
Figure 10:
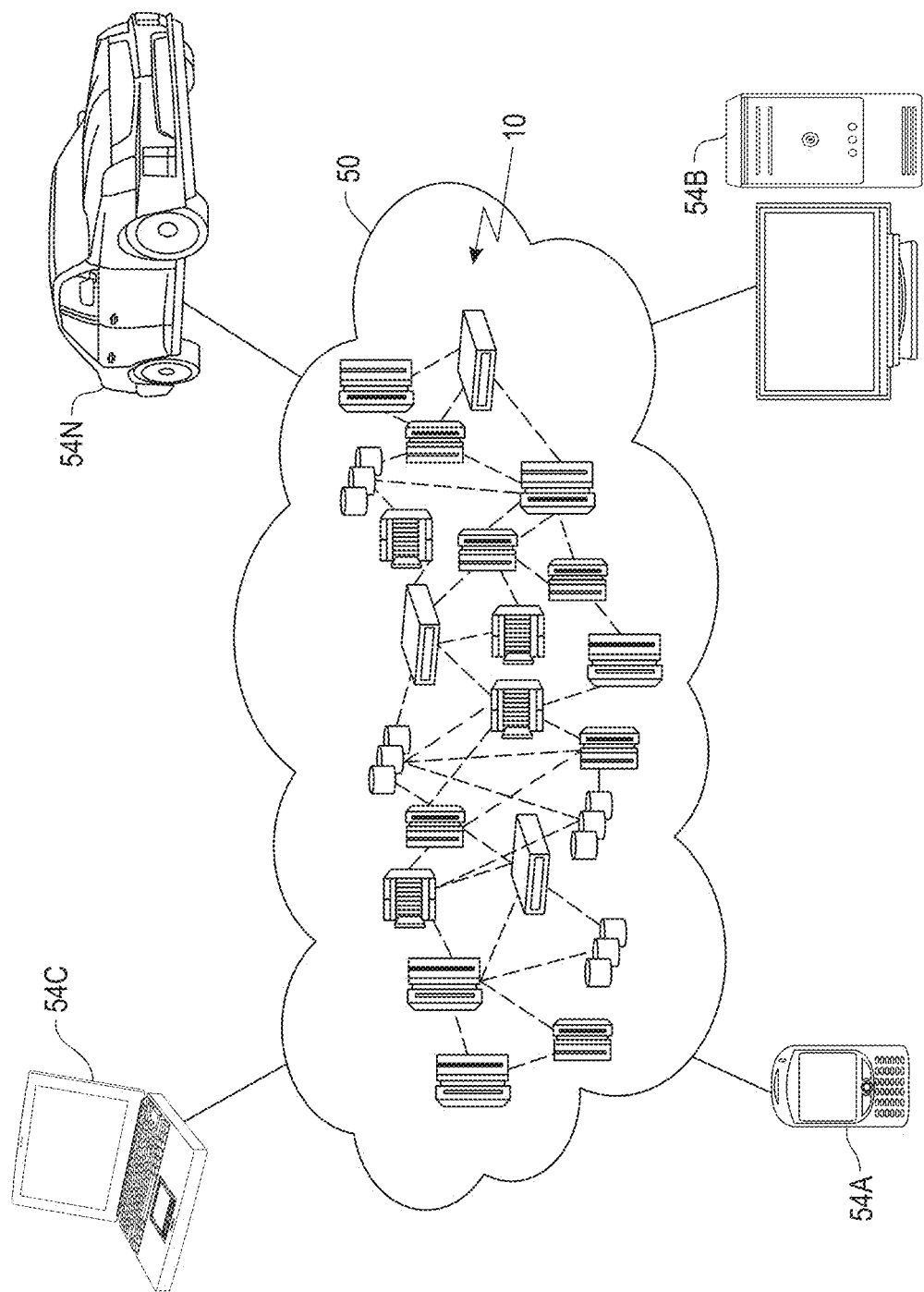
FIG. 10 depicts a cloud computing environment, in accordance with embodiments of the present invention.
Figure 11:
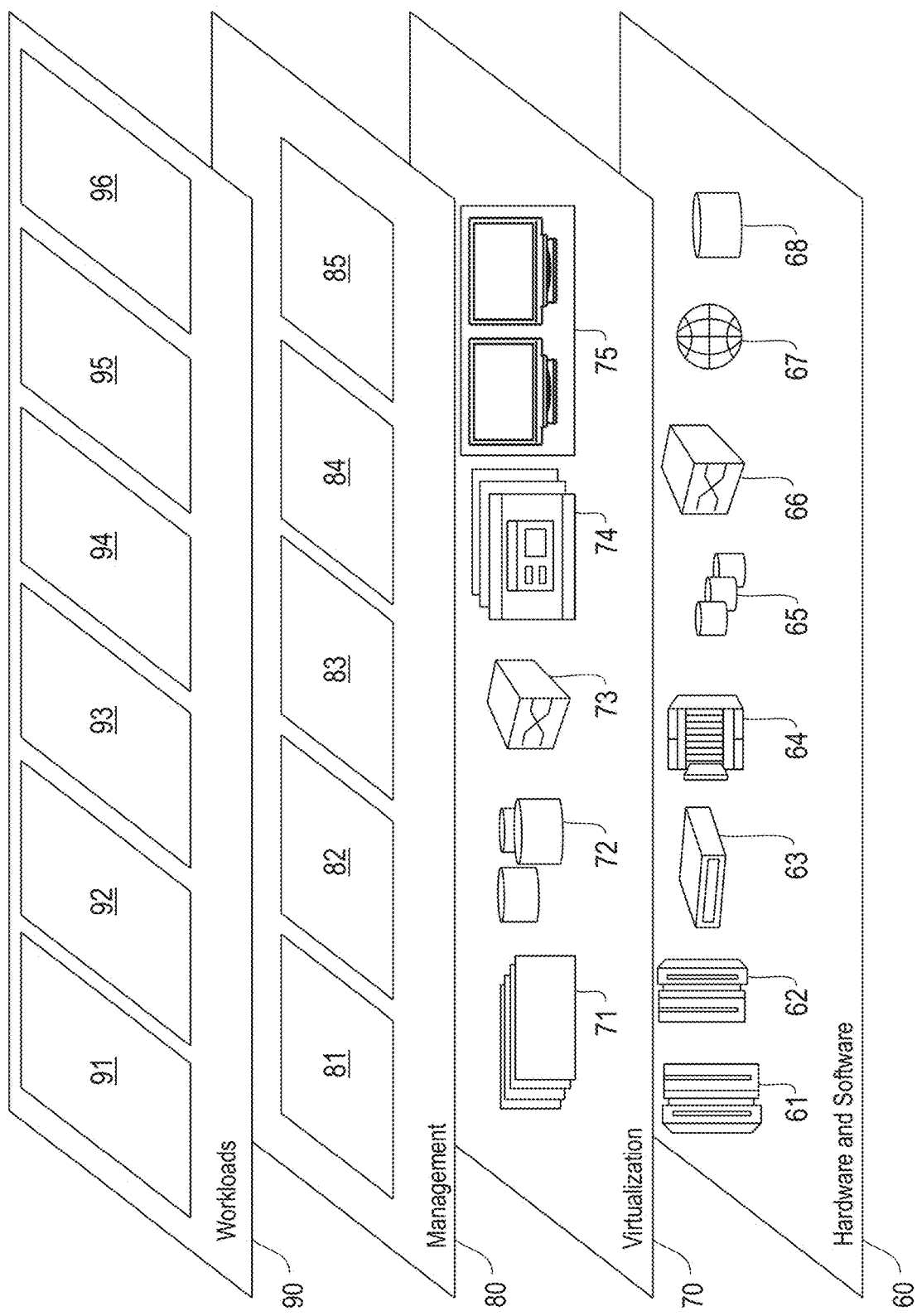
FIG. 11 depicts abstraction model layers, in accordance with embodiments of the present invention.

FIG. 9 depicts a block diagram of an exemplary computer system that may be included in the system for software development 100 of FIGS. 1 and 2, capable of implementing process flows and methods for software development of FIGS. 1-8, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing methods and processes for software development in the manner prescribed by the embodiment in FIGS. 1-8 using one, some or all of the system for software development 100 of FIG. 1, wherein the instructions of the computer code 597 may be executed by processor 591 via memory device 595. The computer code 597 may include software or program instructions that may implement one or more algorithms for implementing the methods and processes for software development, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 4.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from one or more computer data storage units (not shown). The one or more computer data storage units include a known computer-readable storage medium, which is described below. In one embodiment, the one or more computer data storage units may be a non-volatile data storage device, such as a magnetic disk drive (i.e., hard disk drive) or an optical disc drive (e.g., a CD-ROM drive which receives a CD-ROM disk). In other embodiments, the one or more computer data storage unit may include a knowledge base or data repository 125, such as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to identification validation systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to perform methods for software development described herein. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements the methods for software development described herein. Thus, the present invention discloses a process for supporting, deploying and/or integrating computer infrastructure, integrating, hosting, maintaining, and deploying computer-readable code into the computer system 500, wherein the code in combination with the computer system 700 is capable of performing the methods for software development described herein.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers or users, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (see FIG. 5) are shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: import and export 91; continuous feedback 92; dynamic updates 93; cognitive processing 94; continuous enrichment of templates 95; template export engine 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   using, by one or more processors of a computer system, a cognitive model to estimate software development parameters including story points for a software development project based on one or more similar past projects, wherein the story points characterize an amount of effort required to complete a story of the software development project;
   using, by the one or more processors of the computer system, a recursive function to dynamically allocate the story points to sprints for the software development project given effort remaining and stage of the sprint by calculating a maximum business value using a cognitive engine of the cognitive model based on constraints, wherein the constraints include at least budget and effort;
   automatically prioritizing, by the one or more processors of the computer system using the cognitive engine of the cognitive model, the story points for the sprints in calculating the maximum business value using prioritization rule data; and
   automatically assigning, by the one or more processors of the computer system, the story points to the sprints of the software development project based on the estimated software development parameters and the calculated maximum business value.

2. The method of claim 1, further comprising:
   hyper tuning, by the one or more processors of the computer system, the software development parameters to achieve feature engineering with an objective, the performing including selecting relevant features for a linear model and running the linear model.

3. The method of claim 1, further comprising:
   determining, by the one or more processors of the computer system, that measurement vectors in a project management database for the software development project are greater than a threshold; and
   hyper tuning, by the one or more processors of the computer system, the software development parameters to achieve feature engineering with an objective, the hyper tuning including a cross validation process for estimating a shrinkage parameter to extract relevant features.

4. The method of claim 1, further comprising:
   using, by the one or more processors of the computer system, a mathematical model to create multiple gradients for one or more prediction models;
   hyper tuning, by the one or more processors of the computer system, the software development parameters to obtain one or more appropriate loss functions; and
   identifying, by the one or more processors of the computer system, slope parameters for the one or more prediction models using at least one of a stochastic and batch gradient process.

5. The method of claim 1, further comprising:
   facilitating, by the one or more processors of the computer system, a neural network feed-forward propagation having a number of neurons and a number of hidden layers, wherein training the neural network is performed using a rectified linear unit (RLU) activation, and wherein a project management database for the software development project includes measurement vectors that are fed as inputs into the neural network feed-forward propagation.

6. The method of claim 1, further comprising:
   selecting, by the one or more processors of the computer system, best performance models based on cross-validated test data set to evaluate whether all models are linear models; and
   generating, by the one or more processors of the computer system, the software development parameters by using neural networks or regression.

7. The method of claim 1, further comprising:
   enabling, by the one or more processors of the computer system, the cognitive engine of the cognitive model to optimize the sprints and maximize the business value at the start of the sprint and at every stage of the sprint based on a Markov state stage conceptual model.

8. A computer system, comprising:
   one or more processors;
   one or more memory devices coupled to the one or more processors; and
   one or more computer readable storage devices coupled to the one or more processors, wherein the one or more storage devices contain program code executable by the one or more processors via the one or more memory devices to implement a method for automatically assigning sprints of a software development project, the method comprising:

using, by one or more processors of a computer system, a cognitive model to estimate software development parameters including story points for a software development project based on one or more similar past projects, wherein the story points characterize an amount of effort required to complete a story of the software development project; and using, by the one or more processors of the computer system, a recursive function to dynamically allocate the story points to sprints for the software development project given effort remaining and stage of the sprint by calculating a maximum business value using a cognitive engine of the cognitive model based on constraints, wherein the constraints include at least budget and effort;

automatically prioritizing, by the one or more processors of the computer system using the cognitive engine of the cognitive model, the story points for the sprints in calculating the maximum business value using prioritization rule data; and automatically assigning, by the one or more processors of the computer system, the story points to the sprints of the software development project based on the estimated software development parameters and the calculated maximum business value.

9. The computer system of claim 8, the method further comprising:

hyper tuning, by the one or more processors of the computer system, the software development parameters to achieve feature engineering with an objective, the performing including selecting relevant features for a linear model and running the linear model.

10. The computer system of claim 8, the method further comprising:

determining, by the one or more processors of the computer system, that measurement vectors in a project management database for the software development project are greater than a threshold; and hyper tuning, by the one or more processors of the computer system, the software development parameters to achieve feature engineering with an objective, the hyper tuning including a cross validation process for estimating a shrinkage parameter to extract relevant features.

11. The computer system of claim 8, the method further comprising:

using, by the one or more processors of the computer system, a mathematical model to create multiple gradients for one or more prediction models;

hyper tuning, by the one or more processors of the computer system, the software development parameters to obtain one or more appropriate loss functions; and identifying, by the one or more processors of the computer system, slope parameters for the one or more prediction models using at least one of a stochastic and batch gradient process.

12. The computer system of claim 8, the method further comprising:

facilitating, by the one or more processors of the computer system, a neural network feed-forward propagation having a number of neurons and a number of hidden layers, wherein training the neural network is performed using a rectified linear unit (RLU) activation, and wherein a project management database for the software development project includes measurement vectors that are fed as inputs into the neural network feed-forward propagation.

13. The computer system of claim 8, the method further comprising:

selecting, by the one or more processors of the computer system, best performance models based on cross-validated test data set to evaluate whether all models are linear models; and generating, by the one or more processors of the computer system, the software development parameters by using neural networks or regression.

14. The computer system of claim 8, the method further comprising:

enabling, by the one or more processors of the computer system, the cognitive engine of the cognitive model to optimize the sprints and maximize the business value at the start of the sprint and at every stage of the sprint based on a Markov state stage conceptual model.

15. A computer program product for automatically assigning sprints of a software development project, the computer program product comprising:

one or more computer readable storage media having computer readable program code collectively stored on the one or more computer readable storage media, the computer readable program code being executed by one or more processors of a computer system to cause the computer system to perform a method comprising:

using, by one or more processors of a computer system, a cognitive model to estimate software development parameters including story points for a software development project based on one or more similar past projects, wherein the story points characterize an amount of effort required to complete a story of the software development project; and using, by the one or more processors of the computer system, a recursive function to dynamically allocate the story points to sprints for the software development project given effort remaining and stage of the sprint by calculating a maximum business value using a cognitive engine of the cognitive model based on constraints, wherein the constraints include at least budget and effort;

automatically prioritizing, by the one or more processors of the computer system using the cognitive engine of the cognitive model, the story points for the sprints in calculating the maximum business value using prioritization rule data; and automatically assigning, by the one or more processors of the computer system, the story points to the sprints of the software development project based on the estimated software development parameters and the calculated maximum business value.

16. The computer program product of claim 15, the method further comprising:

determining, by the one or more processors of the computer system, that measurement vectors in a project management database for the software development project are greater than a threshold; and hyper tuning, by the one or more processors of the computer system, the software development parameters to achieve feature engineering with an objective, the hyper tuning including a cross validation process for estimating a shrinkage parameter to extract relevant features.

17. The computer program product of claim 15, the method further comprising:
- using, by the one or more processors of the computer system, a mathematical model to create multiple gradients for one or more prediction models;
- hyper tuning, by the one or more processors of the computer system, the software development parameters to obtain one or more appropriate loss functions; and
- identifying, by the one or more processors of the computer system, slope parameters for the one or more prediction models using at least one of a stochastic and batch gradient process.

18. The computer program product of claim 15, the method further comprising:
- facilitating, by the one or more processors of the computer system, a neural network feed-forward propagation having a number of neurons and a number of hidden layers, wherein training the neural network is performed using a rectified linear unit (RLU) activation, and wherein a project management database for the software development project includes measurement vectors that are fed as inputs into the neural network feed-forward propagation.

19. The computer program product of claim 15, the method further comprising:
- selecting, by the one or more processors of the computer system, best performance models based on cross-validated test data set to evaluate whether all models are linear models; and
- generating, by the one or more processors of the computer system, the software development parameters by using neural networks or regression.

20. The computer program product of claim 15, the method further comprising:
- enabling, by the one or more processors of the computer system, the cognitive engine of the cognitive model to optimize the sprints and maximize the business value at the start of the sprint and at every stage of the sprint based on a Markov state stage conceptual model.

* * * * *